US009420347B2

(12) United States Patent
Khouzam et al.

(10) Patent No.: US 9,420,347 B2
(45) Date of Patent: Aug. 16, 2016

(54) ADAPTIVE VIDEO SWITCHING FOR VARIABLE NETWORK CONDITIONS

(71) Applicant: Microsoft Corporation, Redmond, WA (US)

(72) Inventors: Gilles Khouzam, Bothell, WA (US); Donald Karlov, North Bend, WA (US); Wenbo Zhang, Redmond, WA (US); Federico Schliemann, Redmond, WA (US); Sam George, Kenmore, WA (US); Mike Harsh, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 521 days.

(21) Appl. No.: 13/727,332

(22) Filed: Dec. 26, 2012

(65) Prior Publication Data

US 2013/0117792 A1 May 9, 2013

Related U.S. Application Data

(63) Continuation of application No. 12/147,512, filed on Jun. 27, 2008, now Pat. No. 8,352,996.

(51) Int. Cl.

*H04N 21/63* (2011.01)
*H04N 21/23* (2011.01)

(Continued)

(52) U.S. Cl.

CPC ....... *H04N 21/633* (2013.01); *H04N 21/23439* (2013.01); *H04N 21/234354* (2013.01); *H04N 21/234363* (2013.01);

(Continued)

(58) Field of Classification Search

CPC .................... H04N 21/2662; H04N 21/44209; H04N 21/64769; H04L 47/25

See application file for complete search history.

(56) References Cited

U.S. PATENT DOCUMENTS 6,240,094 B1 * 5/2001 Schneider ............ H04L 1/0002 370/412

6,763,237 B1 * 7/2004 Katz ................... H04B 7/0608 370/329

(Continued)

FOREIGN PATENT DOCUMENTS

EP 1189469 A2 3/2002

OTHER PUBLICATIONS

Sun, et al., "Bit-Stream Switching in Multiple Bit-Rate Video Streaming Using Wyner-Ziv Coding", IEEE International Conference on Multimedia and Expo, 2006, Date: Jul. 9-12, 2006 pp. 1665-1668.

(Continued)

*Primary Examiner* — Xavier Szewai Wong

(57) ABSTRACT

A method for video playback switching in response to changing network conditions. The method includes accessing a server to retrieve respective index files for a low bit rate version and a high bit rate version of the video file, and instantiating a low bit rate media player and a high bit rate media. Playback of the video file is begun by the high bit rate media player streaming the high bit rate version from the server. Upon an indication of impeded network conditions, a transition point is selected, wherein the transition point indicates where downloading of the high bit rate version stops and where downloading of the low bit rate version begins. The low bit rate media player is then positioned to begin playback at the transition point. Playback of the video file is then switched to the low bit rate player upon encountering the transition point.

20 Claims, 4 Drawing Sheets

(51) Int. Cl.

| | |
|---|---|
| ***H04N 21/64*** | (2011.01) |
| ***H04N 21/633*** | (2011.01) |
| ***H04N 21/2343*** | (2011.01) |
| ***H04N 21/442*** | (2011.01) |
| ***H04N 21/462*** | (2011.01) |
| ***H04N 21/472*** | (2011.01) |
| ***H04N 21/6373*** | (2011.01) |
| ***H04N 21/6377*** | (2011.01) |
| ***H04N 21/647*** | (2011.01) |

(52) U.S. Cl.

CPC *H04N 21/234381* (2013.01); *H04N 21/44209* (2013.01); *H04N 21/4621* (2013.01); *H04N 21/47202* (2013.01); *H04N 21/6373* (2013.01); *H04N 21/6377* (2013.01); *H04N 21/64738* (2013.01); *H04N 21/64769* (2013.01)

(56) References Cited

U.S. PATENT DOCUMENTS

| | | | | |
|---|---|---|---|---|
| 6,842,724 | B1 | 1/2005 | Lou et al. | |
| 6,909,836 | B2 | 6/2005 | Belley et al. | |
| 7,054,774 | B2 | 5/2006 | Batterberry et al. | |
| 7,075,986 | B2 | 7/2006 | Girod et al. | |
| 7,814,520 | B2 * | 10/2010 | Guedalia | H04N 7/147 725/90 |
| 8,190,760 | B2 * | 5/2012 | Hurst et al. | 709/231 |
| 2002/0091840 | A1 * | 7/2002 | Pulier et al. | 709/228 |
| 2003/0067872 | A1 | 4/2003 | Harrell et al. | |
| 2003/0142744 | A1 * | 7/2003 | Wu et al. | 375/240.03 |
| 2004/0267503 | A1 | 12/2004 | Batterberry et al. | |
| 2004/0268397 | A1 | 12/2004 | Dunbar et al. | |
| 2006/0088094 | A1 | 4/2006 | Cieplinski et al. | |
| 2006/0120378 | A1 | 6/2006 | Usuki et al. | |
| 2006/0126713 | A1 | 6/2006 | Chou et al. | |
| 2006/0135150 | A1 * | 6/2006 | Oh | H04W 36/32 455/425 |
| 2007/0019742 | A1 | 1/2007 | Davis | |
| 2007/0039028 | A1 | 2/2007 | Bar | |
| 2007/0236599 | A1 | 10/2007 | van Beek | |
| 2008/0046939 | A1 | 2/2008 | Lu et al. | |
| 2008/0307483 | A1 | 12/2008 | Iida et al. | |

OTHER PUBLICATIONS

Birney, Bill, "Intelligent Streaming", Date: May 2003, http://www.microsoft.com/windows/windowsmedia/howto/articles/intstreaming.aspx.

Zhang, et al., "Seamless Bit-Stream Switching in Multirate-Based Video Streaming Systems", EURASIP Journal on Applied Signal Processing, vol. 2006 , Year of Publication: 2006, 17 Pages.

Guo, et al., "Delving into Internet Streaming Media Delivery: A Quality and Resource Utilization Perspective", Proceedings of the 6th ACM SIGCOMM conference on Internet measurement, Date: Oct. 25-27, 2006, pp. 217-230.

* cited by examiner

ADAPTIVE VIDEO SWITCHING FOR VARIABLE NETWORK CONDITIONS

CLAIM OF PRIORITY

This application is a continuation of U.S. patent application Ser. No. 12/147,512, filed Jun. 27, 2008, naming Khouzam et al., as the inventor, which is incorporated herein by reference in its entirety and for all purposes.

BACKGROUND

The widespread emergence of the Internet has led to a number of popular online content repositories. An online content repository typically functions as a web-based service that allows users to access and download different types of content. Some of the most compelling content comprises full motion video files. The video files include, for example, clips of television programs, home made video produced via camcorder, cell phone, or the like. Additional examples include professionally produced downloadable movies from commercial web sites, such as, for example, XboxLive™, Netflix™, and the like. The video content can be stored at the repository solely for download. Alternatively, some repositories specialize is allowing users to upload content for sharing.

The common attribute among the video files is their typically large size. For example, a single jpg image can be considered large at 2 to 3 Mbits. In comparison, a DVD quality clip includes 30 frames of 640 by 480 ixels per frame, per second, for approximately 4 Mbits/s to 6 Mbits/s. Thus, large amounts of bandwidth is needed to download video content. The bandwidth requirements are especially problematic when video is downloaded for real time playback. Many megabits per second of bandwidth is needed for good quality real time video playback.

Thus, many conventional schemes have tried to overcome the bandwidth limitations inherent in network based video playback applications. The typical mechanism they use is compression. One solution involves selecting a compression rate that fits the bandwidth conditions of a given link. For example, a cable modem user is typically able to down load higher bit rate content for higher quality video playback in comparison to a DSL user. Because of this, the cable modem user can download content that is encoded at a higher bit rate than the DSL user. Generally, higher bit rate encoding leads to better quality video. This solution can be somewhat effective so long as the network conditions are comparatively constant.

However, network conditions are notoriously variable. In actual use, many different factors impact the bandwidth a user actually experiences. Such factors include contention among many different users accessing the same communications link (e.g., the same coaxial cable), the contention among many different users transmitting across the same wireless frequency, and the like.

Thus, companies that specialize in streaming video over networks need to accommodate the variable transmission conditions. One conventional mechanism involves the video server using a large number of duplicated chunks of a given video clip, where each chunk corresponds to a small time period of the video clip. For example, a 30 minute video clip can be chopped up into 600 five second chunks, each chunk being a specific time period of the clip. Each of these chunks are then replicated a number of times, each time at a different bit rate. Then, as the video is playing, the playback application can determine the network conditions are clogging up the playback. If the available bandwidth is insufficient, the next chunk is requested at the lower bitrate. If additional bandwidth is available, the next chunk is requested at the higher bitrate.

There exists a problem, however, in that in order to make the transitions between the chunks function, each of the chunks need to be "wrapped" in a significant amount of metadata. This metadata is needed by the conventional player to facilitate the assembly and play back of the clip when shifting between different bit rates. Additionally, on the user's machine, a significant amount of processing power is needed to interpret the metadata, strip the metadata out of the video stream, and then decode the video stream itself A significant amount of preprocessing is needed to transform the original video clip into a chunked version, and then replicate the chunks to implement different bit rates. Furthermore, the preprocessing typically forces the inclusion of many artificial cut points to facilitate the bit rate changes. These cut points significantly hurt the low bitrate files. The added cut points increase their overall size by a significant percentage.

Another problem is the fact that complex tools are needed to produce the different versions of the highly chunked video file. These tools are designed for professionals, and although they may provide an end-to-end solution, they are not user-friendly enough or compatible enough to be used by everyday consumers.

Yet another problem is the fact that the output of the preprocessing (e.g., the different versions of the highly chunked video file) is essentially unplayable by anything but a matching highly specialized player that is specifically tuned to interpret the metadata wrappers. The preprocessing takes a nominally readable video file and turns it into the highly chunked version of the video file that is essentially unreadable. A matching, specifically engineered and specialized, player is needed to interpret the chunked video file and properly play it back. Additionally, a considerable tracking burden is imposed through the complexity of managing the numerous chunks created by the preprocessing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a client computer based method for video playback switching in response to changing network conditions is implemented. In response to receiving a user request to playback a video file, the method accesses a server (e.g., or some other source that serves data) to retrieve respective index files (e.g., or indexing metadata, or the like) for a low bit rate version of the video file and a high bit rate version of the video file. A low bit rate media player for the low bit rate version and a high bit rate media player for the high bit rate version are then instantiated on the client. Playback of the video file is begun by the high bit rate media player streaming the high bit rate version from the server. Subsequently, upon an indication of impeded network conditions (e.g., wireless congestion, too many users on the network, etc.), a transition point is selected within the high bit rate version, wherein the transition point indicates where downloading of the high bit rate version stops and where downloading of the low bit rate version begins. The low bit rate media player is then positioned to begin playback at the transition point. Playback of the video file is switched from the high bit rate player to the low bit rate player upon encountering the transition point, where after the low bit rate player streams the low bit rate version from the server. The switch from playing of the high bit rate version to playing of the low bit rate version appears seamless to the user.

In one embodiment, upon an indication of improved network conditions, a subsequent transition point is selected within the low bit rate version, indicating where downloading of the low bit rate version stops and where downloading of the high bit rate version begins. The high bit rate media player is positioned to begin playback at the transition point, and playback of the video file is switched from the low bit rate player back to the high bit rate player at the transition point, thereby allowing the method to switch back to the high bit rate version when network conditions improve.

In one embodiment, the transition point is located at a keyframe of the video file to facilitate switching to the low bit rate player. In one embodiment, the transition point is located a number of frames away from the keyframe, and the low bit rate player downloads the number of frames and the keyframe, processes them in the background, and uses the resulting information to position itself at the transition point.

In this manner, a user of a video playback application can access a given video hosted on a video server and stream the video for immediate playback. The application has sufficient intelligence to choose a correct bit rate version of the file suited to, for example, average network bandwidth conditions, and then dynamically switch to a lower bit rate version if conditions deteriorate, or switch to a higher bit rate version if conditions improve. Additionally, the switching can be implemented without using any preprocessing, chunking, or otherwise altering the quality of the original video file.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the claimed subject matter, examples of which are illustrated in the accompanying drawings. While the embodiments will be described, it will be understood that the description are not intended to limit the claimed subject matter to these embodiments. On the contrary, the claimed subject matter is intended to cover alternatives, modifications and equivalents, which may be included within the spirit and scope as defined by the appended claims. Furthermore, in the following detailed description, numerous specific details are set forth in order to provide a thorough understanding of the embodiments. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Some portions of the detailed descriptions are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussions, it is appreciated that throughout the present invention, discussions utilizing terms such as " processing" or "accessing" or "switching" or "decoding" or "downloading" or the like, refer to the action and processes of a computer system (e.g., computer system 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
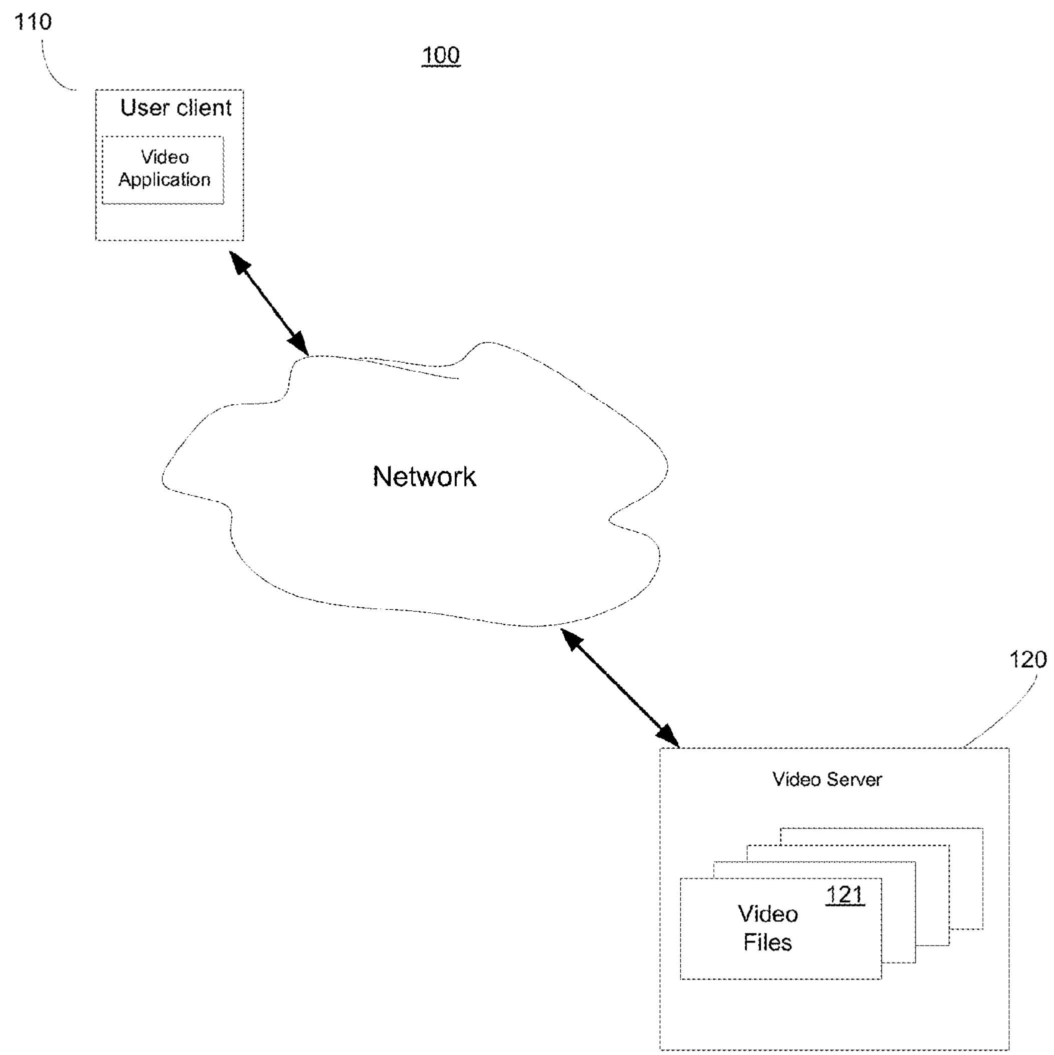
FIG. 1 shows an overview diagram of an exemplary operational setting for implementing video playback switching in accordance with one embodiment.

FIG. 1 shows an overview diagram of an exemplary operational setting 100 for implementing video playback switching in accordance with one embodiment. As depicted in FIG. 1, system 100 illustrates the relationships and the communications that are implemented between a client 110 (e.g., a user on a user client computer system) and a video server 120 hosting a plurality of video files 121. Both the client 110 and the video server 120 are coupled to communicate via the network (e.g., the Internet).

In one embodiment, the client computer system (e.g., user 110) executes a video application 115 that implements the video playback switching in response to changing network conditions (e.g., the communications bandwidth available via the Internet, a wireless network, etc.). In response to receiving a user request to playback one of the video files 112, the application 115 accesses the server 120 to download respective index files for the selected video file. The index files allows the application 115 to download a selected portion of its corresponding video file, as opposed to downloading the entire video file. The index files enable the application 115 to intelligently position a transition point within a currently playing version of a video file, and to synchronize a new version. This placement and synchronization enables a seamless transition from the currently playing version (e.g., playing a high bit rate) to the new version (e.g., playing at a low bit rate).

It should be noted that the information conferred by the index files does not need to be in a file form. For example, the information conferred by index files can be included within the video file itself using indexing metadata. Alternatively, the information could be inferred through calculations or a similar approach.

It should be noted that although embodiments are described with respect to a server, the constituent files or media can be accessed from a number of different sources. While the data is in fact being served, the term "server" is not meant to limit the scope of the embodiments to receiving data from a physical computer located somewhere whose purpose is to give out files. For example, embodiments can include a distribution point or a media source for those situations where the video files are stored on a local disk and the streamed video content is from the local distribution point or local source (e.g., the local disk). In such embodiments, the arbiter adapts to local playback conditions of a host machine (e.g., bus contention, processor contention, GPU hardware contention, etc.).

Figure 2:
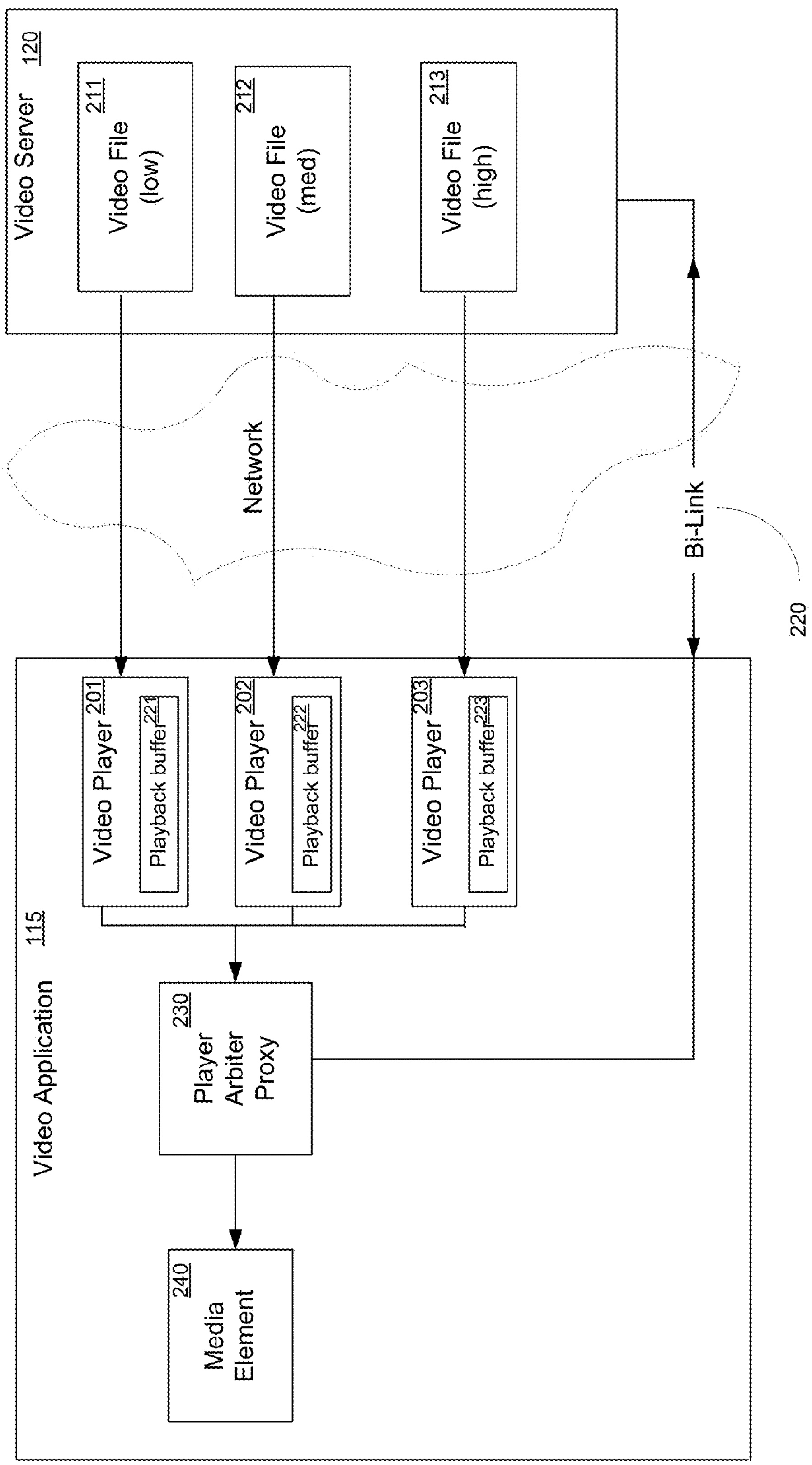
FIG. 2 shows a diagram depicting the video application and the video server in accordance with one embodiment.

FIG. 2 shows a diagram depicting the video application 115 and the video server 120 in accordance with one embodiment. As depicted in FIG. 2, the video application 115 is shown with three video players 201-203 coupled to stream video from three corresponding video file versions 211-213.

In the FIG. 2 embodiment, the application 115 instantiates a video player for each version of the video file it discovers within the video server 120. For example, upon receiving a user selection to stream a given video file, the application 115 can communicate with the video server 120 to determine how many versions of the video file are stored thereon. In this example, there are three different versions 211-213. Each of the versions 211-213 has a respective index file, and these files are downloaded by the application 115.

Playback of the video file is then begun using the "default" version. For example, the default version can be the version suited to the average bandwidth conditions of the network. Alternatively, the default version can be the high bit rate version, which can be advantageous for those client machines having particularly fast network connections (e.g., cable modems, etc.).

For example, assuming a scenario where the default version is the high bit rate version 213, the video player 203 begins play back of the high bit rate version 213. The video player 203 streams the data comprising the high bit rate version 213 across the network as shown. If network conditions remain favorable, streaming continues uninhibited and video playback proceeds normally. If network conditions deteriorate, the switching process can be initiated.

Each of the video players 201-203 includes a respective playback buffer 221-223. The playback buffers 221-223 function by providing an indication of the current condition of the network. For example, as the data comprising the high bit rate version 213 streams into the video player 203, that data fills a playback buffer 223 at a certain rate. The playback buffer 223 simultaneously drains, as the data is processed and played back to the user. In a steady-state condition, where the network allows the data to stream in as fast as it is consumed by the video player 203, the "drainage state" of the playback buffer 223 will remain constant (e.g., at a halfway threshold, etc.). In an impeded condition, where the transmission conditions of the network do not allow the data to stream in as fast as it is consumed, the drainage state will move towards the empty position (e.g., fall below a halfway threshold, etc.). Similarly, in an improved condition, were the transmission conditions get more favorable, the drainage state will move towards the optimal position (e.g., back towards the halfway threshold, etc.). In this manner, movement of the drainage state provides the indication of the network condition.

Subsequently, continuing the above scenario, upon an indication of impeded network conditions (e.g., wireless congestion, too many users on the network, etc.), a transition point is selected within the high bit rate version 213. The transition point indicates where downloading of the high bit rate version 213 stops and where downloading of a lower bit rate version begins (e.g., version 212 or version 211). The low bit rate media player is then positioned to begin playback at the transition point. Playback of the video file is switched from the high bit rate player to the low bit rate player upon encountering the transition point, where after the low bit rate player streams the low bit rate version from the server. The switch from playing of the high bit rate version to playing of the low bit rate version appears seamless to the user, since the setting of the transition point and the adjusting of the transition point occurs within the memory of the playback buffers 221-223. While the transition point is selected, the new stream is downloaded such that playback starts at the transition point, but before playback reaches that point. This attribute ensures that the playback buffer of the new stream can fill itself and sustain the playback.

In one embodiment, upon an indication of improved network conditions, a subsequent transition point is selected within the low bit rate version, indicating where downloading of the low bit rate version stops and where downloading of the high bit rate version begins. The high bit rate media player is then positioned to begin playback at the transition point. The positioning can be likened to a fast-forward, for example, whether player proceeds from the beginning of the version to the exact position of the transition point. The subsequent player then essentially idles at that position, waiting to be activated. When the lower bit rate player reaches the transition point, playback of the video file is switched from the lower bit rate player to the high bit rate player, thereby allowing the application 115 to switch back to the high bit rate version (e.g., video file version 213) when network conditions improve. It should be noted, however, that even though the subsequent player is idle, it would still be downloading its respective version in order to keep its buffer as full as possible. The subsequent player does not stop downloading its respective version even though it's playback mechanism could be idle waiting for the transition point.

In this manner, the application 115 can switch between the different versions 211-213 depending upon the transmission conditions of the network. For example, depending upon the variability of a given network, the video server can include a plurality of different versions of the video file with each of the versions having a respective different bit rate (e.g., beyond the three versions shown in FIG. 2). A corresponding plurality of respective different media players can be instantiated to enable switching playback between the different versions. This attribute enables the application 115 to dynamically adapt to changing network conditions.

Referring still to FIG. 2, the switching between the different video players 201-203 is controlled by a player arbiter proxy 230. The player arbiter proxy 230 arbitrates between the different video players 201-203 to select the particular one of the players from which the video will be displayed. The selected video feed is displayed via the media element 240. The media element 240 is a software component that determines, among other things, the dimensions of the video playback (e.g., number of pixels wide and number of pixels tall) and the location (e.g., pixel x y coordinates) of the video playback on a display coupled to the client 110. The player arbiter proxy 230 functions as a proxy due to the fact that regardless of which video player 201-203 is selected, the media element 240 is merely aware of the fact that it receives a video stream from the player arbiter proxy 230.

It should be noted that the transition point can be located at a keyframe to facilitate switching from the high bit rate player 203 to the low bit rate player (e.g., player 202 or player 201). The keyframe provides a convenient switching position since the keyframe can be readily decoded.

Alternatively, it should be noted that the transition point can be located some number of frames away from a keyframe. Although the keyframe may prove convenient, the transition point does not need to be located there. For example, in a case where the transition point is located some number of frames subsequent prior to the keyframe, the number of frames and the keyframe are downloaded (e.g., using a byte range request). The number of frames and the keyframe are then processed in memory to decode and obtain the specific frame of the transition point. Then, as described above, the new player can be positioned at the transition point frame, and wait until the current player reaches the transition point.

Once the transition point is encountered, the new player takes over, as described above. In one embodiment, the number of frames and the keyframe are downloaded in the background. The new player is also positioned to begin playback at the transition point in the background. In one embodiment, a byte range request is provided by the player arbiter proxy 230 to the video server 120 (e.g., via the bidirectional link 220) in order to obtain that portion of a video file version that contains the number of frames and the keyframe.

It should be noted that the video file can be one of a number of different types of video files encoded using one of a number of different types of video codecs. Examples include, MPEG-1, MPEG-2, H.263, H.264, WMV, VC-1, and the like. Each of these formats can be stored in a number of different bit rate versions, such as 150 kbps, 200 Kbps, 500 Kbps, 1200 Kbps, and the like.

It should be noted that each version of the video file is independently playable. For example, each of the versions 211-213 comprise an independently playable file. In contrast to many conventional solutions, the versions 211-213 have not been chunked, chopped up, divided, or otherwise partitioned into numerous pieces. The versions 211-213 do not include chunks that are wrapped in metadata. The versions 211-213 are playable using a video player that has not been adapted for any special switching functionality. For example, one could take the video file version 211 and play it in a non-switching aware video player without problems. This attribute allows the application 115 to be compatible with, for example, legacy video files having legacy video file formats, codecs, and bit rates.

Referring still to FIG. 2, it should be noted that there may be other factors that affect switching between the different versions 211-213 besides their respective bit rates. For example, the versions 211-213 can be in different video formats using different video codecs. Instead of using different bit rate versions to affect the video playback perceived by the user, the differences in the formats can be used (e.g., low CPU intensity, medium CPU intensity, and high CPU intensity). For example, some formats are much more CPU intensive to execute than other formats. This would allow one embodiment to deal with conditions that affect CPU or other types of hardware contention. For example in a case where CPU or other hardware availability is low, a low CPU intensity version (e.g., video file version 211) can be played. In a case where CPU availability is high, a high CPU intensity version can be played (e.g., video file version 212 or 213). In such an embodiment, the application 115 can respond to varying conditions, where such conditions can include a number of factors, such as CPU or other hardware contention, network bandwidth, and the like. A default video file version can be initially played, and then when varying conditions, such as CPU contention or network bandwidth, indicate impeded playback or improved playback, the application can switch to a new video file version.

In this manner, each of the playback buffers 221-223 function as a contention indicator that indicates impeded playback or improved playback. Based upon the contention indicators, the application 115 switches playback of the video file from the default one of the different versions to a subsequent one of the different versions.

Figure 3:
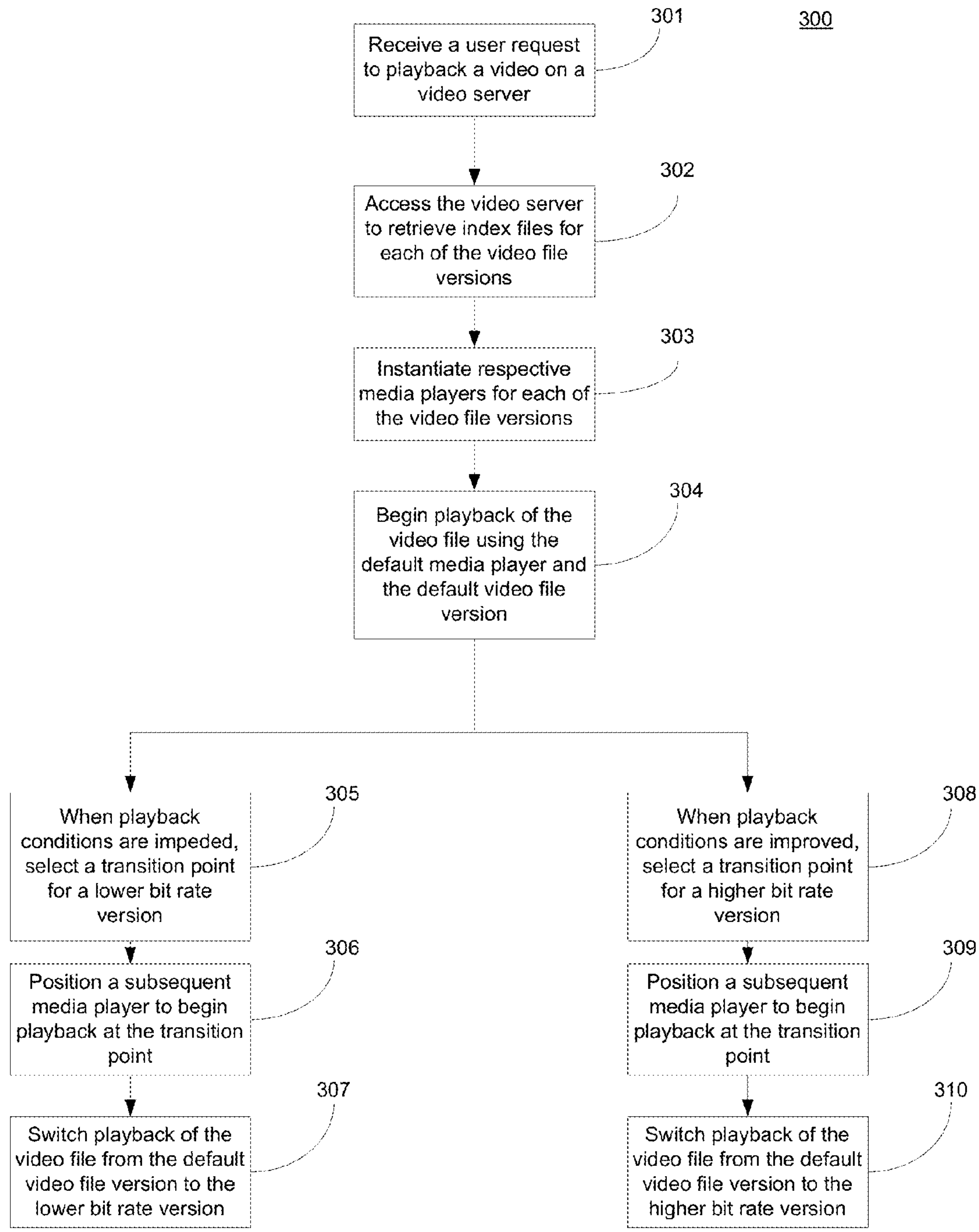
FIG. 3 shows a flowchart of the steps of an exemplary operating process in accordance with one embodiment.

Referring now to FIG. 3, a flowchart of the steps of a process 300 in accordance with one embodiment is shown. As depicted in FIG. 3, process 300 shows the typical operating steps of a video playback switching process as implemented by a client computer system (e.g., client 110).

Process 300 begins in step 301, where a user request to playback a video stored on a video server is received by a video application (e.g., application 115) executing on a client computer system. In step 302, in response to the user request, the application 115 accesses the video server (e.g., video server 120) to retrieve index files for each of the video file versions corresponding to the selected video file. In step 303, the application 115 instantiates respective media players for each of the video file versions. Subsequently, in step 304, the application 115 begins play back of the video file using a default media player and a default video file version. As described above, the default version can be selected to be that version which most closely matches the expected network conditions experienced at the client.

Process 300 continues, as the default video file version is played. In step 305, when playback conditions are impeded (e.g., network congestion, CPU availability, etc.), the video player arbiter (e.g., player arbiter proxy 230) of the application 115 selects a transition point for a lower bit rate version. In step 306, a subsequent media player for the lower bit rate version is positioned to begin playback at the transition point. Then, in step 307, the playback of the video file is switched from the default video file version to the lower bit rate version.

Alternatively, as the default video file version is played, process 300 can continue to step 308, where when playback conditions are improved, the video player arbiter selects a transition point for a higher bit rate version. In step 309, the video player arbiter positions a subsequent media player to begin playback at the transition point. Then, in step 310, the playback of the video file is switched from the default video file version to the higher bit rate version.

Figure 4:
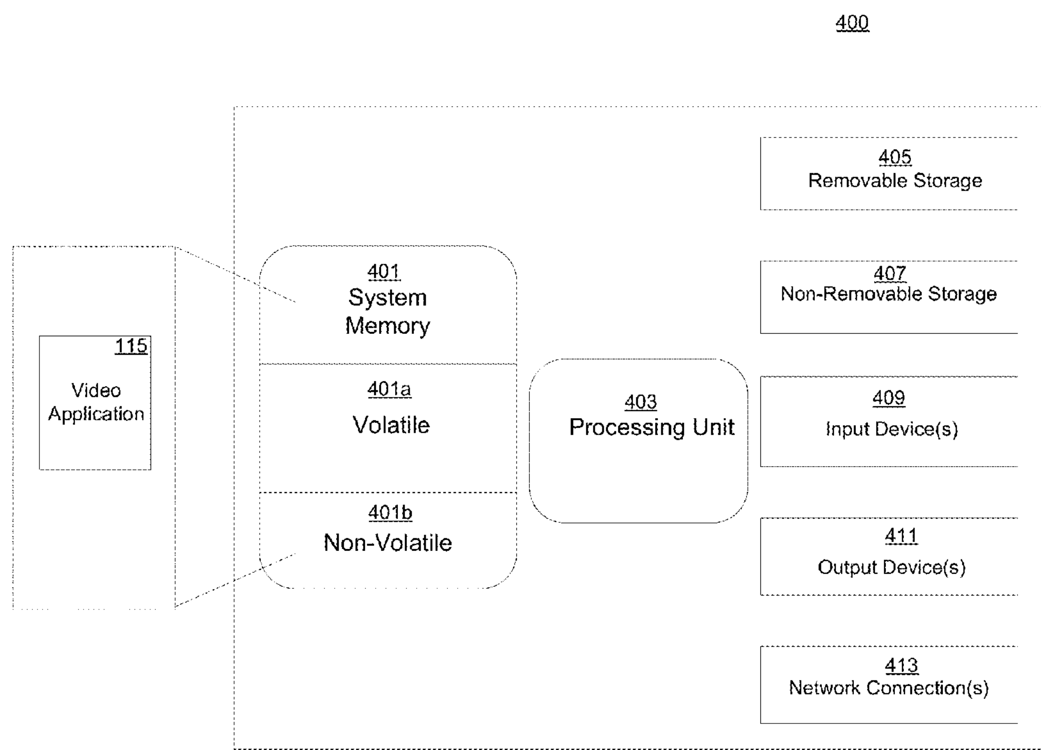
FIG. 4 shows an exemplary computer system in accordance with one embodiment.

FIG. 4 shows an exemplary computer system 400 according to one embodiment. Computer system 400 depicts the components of a basic computer system providing the execution environment for certain hardware-based and software-based functionality for the above described embodiments. For example, computer system 400 can be a system upon which the video application 115 from FIG. 1 is instantiated. Computer system 400 can be implemented as, for example, a desktop computer system, laptop computer system or server computer system. Similarly, computer system 400 can be implemented as a handheld device. Computer system 400 typically includes at least some form of computer readable media. Computer readable media can be a number of different types of available media that can be accessed by computer system 400 and can include, but is not limited to, computer storage media.

In its most basic configuration, computer system 400 typically includes processing unit 403 and memory 401. Depending on the exact configuration and type of computer system 400 that is used, memory 401 can be volatile (e.g., such as DRAM, etc.) 401*a*, non-volatile 401*b* (e.g., such as ROM, flash memory, etc.) or some combination of the two.

Additionally, computer system 400 can include mass storage systems (e.g., removable 405 and/or non-removable 407) such as magnetic or optical disks or tape. Similarly, computer system 400 can include input devices 409 and/or output devices 411 (e.g., such as a display). Computer system 400 can further include network connections 413 to other devices, computers, networks, servers, etc. using either wired or wireless media. As all of these devices are well known in the art, they need not be discussed in detail.

The foregoing descriptions of the embodiments have been presented for purposes of illustration and description. They are not intended to be exhaustive or to limit the claimed subject matter to the precise forms disclosed, and many modifications and variations are possible in light of the above teaching. The embodiments were chosen and described in order to best explain the principles and practical applications of the embodiments, to thereby enable others skilled in the art to best utilize the invention and various embodiments with various modifications as are suited to the particular use contemplated. It is intended that the scope of the claimed subject matter be defined by the claims appended hereto and their equivalents.

What is claimed is:

1. A system for video playback switching, comprising:

a client computing device comprising:

a memory device configured to store a plurality of programmed instructions and a plurality of index files of a low bit rate version and a high bit rate version of a video file received from a remote server;

a processor configured to instantiate a low bit rate media player application and a high bit rate media player application for streaming respective versions of the video file, to detect an indication of impeded playback conditions, to select a first transition point in the high bit rate version based on the impeded playback conditions, to position the low bit rate media player for playback of the low bit rate version beginning at a position in the low bit version corresponding to the first transition point while the high bit rate version is streaming, and to switch between the high bit rate media player and the low bit rate media player when the first transition point is reached, wherein the playback conditions comprise current network and local hardware conditions corresponding to the client device.

2. The system according to claim 1, wherein the first transition point is indicative of where streaming of the high bit rate version stops and streaming of the low bit rate version begins.

3. The system according to claim 1, wherein, the client device is further configured to select a second transition point upon an indication of improved playback conditions, the second transition point being comprised within the low bit rate version.

4. The system according to claim 3, wherein the second transition point indicates where a downloading of the low bit rate version stops and where a downloading of the high bit rate version begins.

5. The system according to claim 3, wherein the high bit rate media player is further configured to begin playback at the second transition point.

6. The system according to claim 5, wherein a playback of the video file is switched from the low bit rate player to the high bit rate player upon encountering the second transition point, where after the high bit rate player resumes streaming the high bit rate version from the server.

7. The system of claim 1, wherein the server further comprises a plurality of different versions of the video file with each of the plurality of versions having a respective different bit rate, and wherein the client device is configured to instantiate a corresponding plurality of respective different media players to enable switching playback of the video file between the plurality of different versions to dynamically adapt to changing playback conditions.

8. The system of claim 1, wherein the high bit rate media player comprises a playback buffer, and wherein the indication of impeded playback conditions comprises a drainage state of the playback buffer within the high bit rate media player indicating the streaming is being impeded by the playback conditions.

9. The system of claim 1, further comprising a player arbiter coupled to the low bit rate media player and the high bit rate media player, wherein a switching of the playback of the video file is controlled by the player arbiter.

10. The system of claim 1, wherein a switch between the high bit rate media player and the low bit rate media player appears seamless to a user of the client device.

11. The system of claim 1, wherein a switch between the low bit rate media player and the high bit rate media player appears seamless to a user of the client device.

12. The system of claim 1, wherein the low bit rate version of the video file is independently playable from the high bit rate version of the video file.

13. The system of claim 1, wherein the high bit rate version of the video file is independently playable from the low bit rate version of the video file.

14. The system of claim 1, wherein the first transition point is located at a keyframe to facilitate a switch to the low bit rate player.

15. The system of claim 14, wherein the first transition point is located a number of frames away from a keyframe, and wherein the number of frames and the keyframe are downloaded in the client device to position the low bit rate media player to begin playback at the transition point.

16. The system of claim 15, wherein the number of frames and the keyframe are downloaded in the background and the low bit rate media player is positioned to begin playback at the first transition point in the background.

17. The system of claim 1, wherein the low bit rate version comprises a different file format from the high bit rate version.

18. The system of claim 1, wherein the network conditions comprises a network transmission bandwidth.

19. The system of claim 18, wherein the indication of impeded playback conditions comprises a decrease in network transmission bandwidth.

20. The system of claim 1, wherein the client device comprises a processor, and wherein the local hardware conditions comprises a processor availability for video playback.

* * * * *